(12) United States Patent
Choi et al.

(10) Patent No.: US 7,745,002 B2
(45) Date of Patent: Jun. 29, 2010

(54) METHOD OF COATING THE SURFACE OF AN INORGANIC POWDER AND A COATED INORGANIC POWDER MANUFACTURED USING THE SAME

(75) Inventors: Jae-young Choi, Gyeonggi-do (KR); Jong-heun Lee, Gyeonggi-do (KR); Seong-hyeon Hong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 947 days.

(21) Appl. No.: 11/319,450

(22) Filed: Dec. 29, 2005

(65) Prior Publication Data

US 2006/0099409 A1 May 11, 2006

Related U.S. Application Data (62) Division of application No. 10/780,626, filed on Feb. 19, 2004, now abandoned.

(30) Foreign Application Priority Data

Feb. 19, 2003 (KR) ................. 2003-10415

(51) Int. Cl.
*B32B 5/66* (2006.01)
(52) U.S. Cl. ............... 428/403; 428/404; 428/407; 427/212; 427/215
(58) Field of Classification Search .......... 428/403, 428/404, 407; 427/212, 215; 327/215
See application file for complete search history.

(56) References Cited

U.S. PATENT DOCUMENTS

| | | | |
|---|---|---|---|
| 5,266,536 | A | 11/1993 | Egerton et al. |
| 6,187,438 | B1 * | 2/2001 | Chopin et al. ........ 428/403 |
| 6,207,280 | B1 * | 3/2001 | Atarashi et al. ........ 428/403 |
| 6,268,054 | B1 | 7/2001 | Costantino et al. |

FOREIGN PATENT DOCUMENTS

| EP | 0 834 370 B1 | 4/1998 |
|---|---|---|
| KR | 2000-0001996 | 1/2000 |

OTHER PUBLICATIONS

Gobel Rudolf, Wissensspeicher Großen Einheiten. 4. Aufl. Berlin: Volk und Wissen Volkseigener Verlag, 1989, pp. 86-89. ISBN: 3-06-021707-6.
German Office Action dated Mar. 30, 3005.

* cited by examiner

*Primary Examiner*—Leszek Kiliman
(74) *Attorney, Agent, or Firm*—Cantor Colburn LLP (57) ABSTRACT

The present invention provides a method of coating the surface of an inorganic powder comprising; (a) providing an alcohol solution of an alcohol-soluble metal salt and an alcohol solution of an amine compound; and (b) mixing and stirring the two alcohol solutions with an inorganic powder and water, thereby coating the surface of the inorganic powder with a metal hydroxide produced from the alcohol-soluble metal salt. The inorganic powders coated with metal oxide manufactured according to the present invention exist independently without substantial agglomeration, and the metal oxide coating is deposited substantially only on the surface of the inorganic powder with uniform thickness without substantial clustering among the inorganic powders. Consequently, when a Ni electrode layer is prepared using the titanium oxide coated Ni powders manufactured according to the present invention, not only quality but also yield of MLCC can be improved.

22 Claims, 5 Drawing Sheets

METHOD OF COATING THE SURFACE OF AN INORGANIC POWDER AND A COATED INORGANIC POWDER MANUFACTURED USING THE SAME

CROSS-REFERENCE TO RELATED APPLICATIONS

This application is a divisional application under 35 U.S.C. § 120 of Ser. No. 10/780,626, filed Feb. 19, 2004, which is hereby incorporated by reference in its entirety, which claims priority under 35 U.S.C. § 119 to Korean Application No. 2003-10415, filed Feb. 19, 2003, which is hereby incorporated by reference in its entirety.

BACKGROUND OF THE INVENTION

1. Field of Invention

The present invention relates to a method of coating the surface of an inorganic powder and a coated inorganic powder manufactured by this method, more particularly, it is related to a method of depositing a uniform metal oxide coating on the surface of an inorganic powder which can be used in the manufacture of Multi Layer Ceramic Capacitor or as an active material in lithium batteries.

2. Description of the Related Art

Multi Layer Ceramic Capacitor (hereinafter 'MLCC') consists of multi-layers of capacitors in which a dielectric ceramic layer of $BaTiO_3$ is inserted between thin-layer metal electrodes like Nickel or Copper. MLCC is widely used in computers, mobile communication equipments, and other small electronic equipments due to its small volume but large capacity.

Ag—Pd alloys that have been used as the metal electrode have the advantage of being able to be sintered in air, but it has the drawback of high manufacturing cost. Therefore, in the late 1990s in order to reduce the manufacturing cost, Ag—Pd alloys were replaced by Ni, and a Ni-MLCC technology of firing Ni was introduced in a reducing atmosphere to prevent oxidation of Ni.

Figure 1:
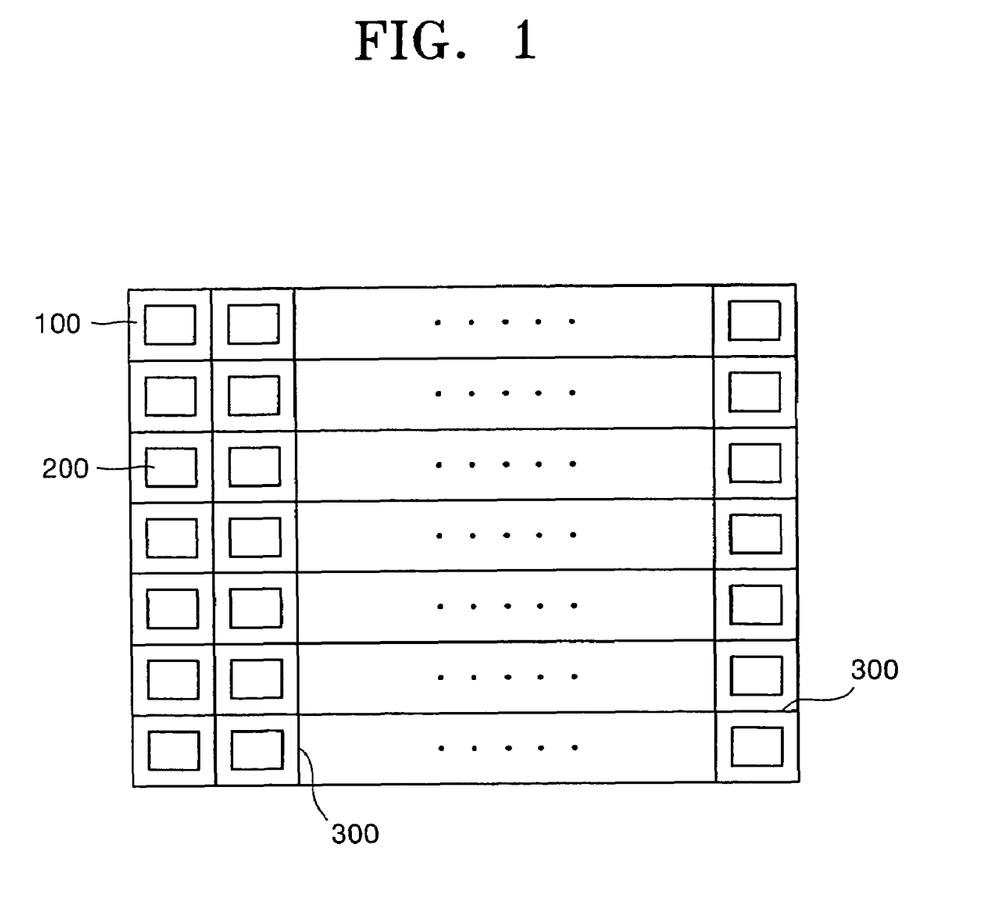
FIG. 1 is a plan view illustrating schematically $BaTiO_3$ powder dielectric layer 100 and Ni powder electrode layer pattern 200 formed during the manufacturing process of Ni-MLCC.

FIG. 1 is a plan view illustrating schematically $BaTiO_3$ powder dielectric layer 100 and Ni powder electrode layer pattern 200 formed during the manufacturing process of the Ni-MLCC.

The conventional manufacturing process of Ni-MLCC is described while referring to FIG. 1. First, $BaTiO_3$ powder dielectric layer 100 is formed by coating a surface, such as a PET film, with $BaTiO_3$ powder dispersion. Afterwards, the Ni powder dispersion is screen-printed on the $BaTiO_3$ powder dielectric layer to form a plurality of Ni powder electrode layer pattern 200. By repeating the processes of forming BaTiO3 powder dielectric layer 100 and Ni powder electrode layer pattern 200, multi-layers of BaTiO3 powder layer 100 and Ni powder electrode layer pattern 200 are formed. This multilayer is then cut along the cutting line 300 and sintered to transform $BaTiO_3$ powder dielectric layer 100 and Ni powder electrode layer pattern 200 into $BaTiO_3$ mono-layer dielectric layer and Ni mono-layer electrode layer pattern, respectively. This completes the manufacturing of Ni-MLCC.

The Ni powder electrode layer pattern 200 contains a large amount of organic vehicle prior to the sintering process, which causes the Ni powder to have a relatively low packing density. Therefore, when sintering, the Ni powder electrode layer pattern 200 shows greater shrinkage than the $BaTiO_3$ powder dielectric layer 100.

In addition, the sintering temperature of Ni powder is about 600° C. and that of $BaTiO_3$ is about 1250~1300° C. Ni powder starts to shrink significantly around 400~500° C., while, $BaTiO_3$ powder starts to shrink beyond about 1100° C. Therefore, in the sintering process, the Ni powder electrode layer pattern 200 starts to shrink at a temperature range of 400~500° C. but the $BaTiO_3$ powder dielectric layer 100 shows no actual shrinkage in this temperature range.

Due to the difference in the shrinkage rate and in the temperature range of shrinkage between the $BaTiO_3$ powder dielectric layer 100 and the Ni powder electrode layer pattern 200, there is a strong contraction stress between the above two layers. From time to time, this contraction stress causes severe problems like poor contact ability between electrodes or the delamination of layers between the Ni electrode layer and the $BaTiO_3$ dielectric layer.

Accordingly, several solutions have been proposed to solve the poor contact between electrodes or the above delamination of layers between the Ni electrode and the $BaTiO_3$ dielectric layer. One solution to these problems, was to fill the pores among the Ni powders with $BaTiO_3$ powder to reduce shrinkage of the Ni powder electrode layer pattern 200. However, this solution was not successful because the difference in shrinkage rate during sintering could not be decreased significantly since the entire surface of the Ni powders were not covered with the dielectric powders on purpose in order to secure contact between the Ni powders.

Another solution used to reduce heat-shrinkage rate of the Ni powder electrode layer is to form the Ni powder electrode layer pattern 200 by using Ni powder coated with a metal oxide, whose shrinkage starting temperature is close to that of $BaTiO_3$. Metal oxides that can be used for coating the Ni powder are $MgO$, $SiO_2$, $TiO_2$, $BaTiO_3$ and rare-earth metal oxides. These metal oxides can coat the surface of Ni powders using spray thermal decomposition or sol-gel coating process disclosed in U.S. Pat. No. 6,268,054, for example.

Spray thermal decomposition is a method of forming Ni powder in which a solution containing both thermally decomposable compounds and Ni powders are sprayed to a heating tube, and the thermally decomposable compounds are thermally decomposed, thereby producing Ni powders coated with metal oxide. However, using this method metal oxide is formed not only on the surface of the Ni powders but also within the Ni powders. This results in waste of the raw materials and also high processing costs.

In the sol-gel coating method, after dissolving coating materials in water, Ni powders are added in the solution and through the sol-gel reaction, the surface of the Ni powders are coated with the coating materials physically/chemically. The coated Ni powders are filtered, dried, and heat-treated, to thereby crystallize the coated layer. This method provides the Ni powders with a strong metal oxide coating layer, and allows mass production of coated Ni powders economically.

Figure 2:
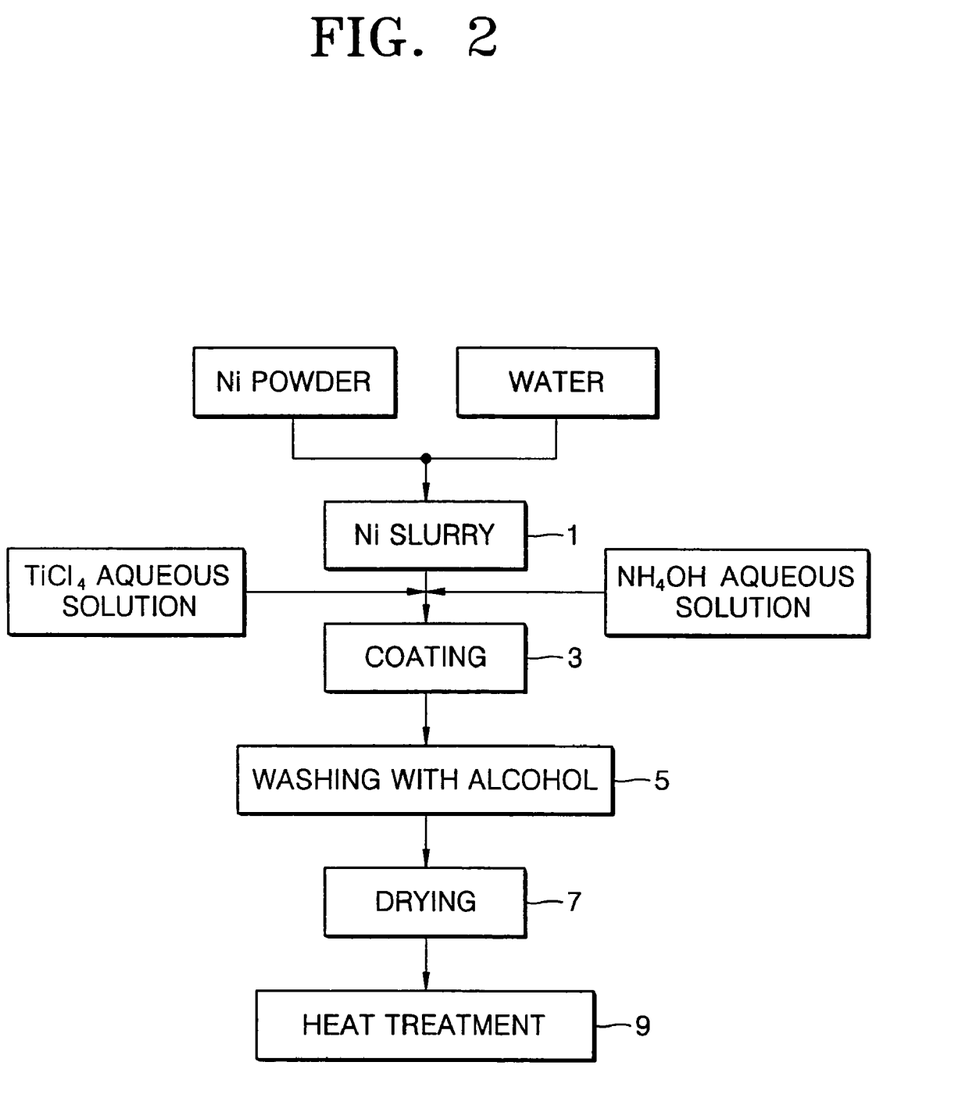
FIG. 2 is a flow chart illustrating the manufacture of Ni powders coated with titanium oxide by the sol-gel coating method.

FIG. 2 is a flow chart illustrating the manufacture of Ni powders coated with titanium oxide by the sol-gel process. Referring to FIG. 2, an aqueous Ni slurry (1), i.e., Ni powder dispersed in water, is mixed with a $TiCl_4$ aqueous solution and an $NH_4OH$ aqueous solution under stirring. $TiCl_4$ precipitates as titanium hydroxides, $Ti(OH)x$, after undergoing reaction with hydroxide ions produced by the acid-base reaction formula illustrated below:

The resulting titanium hydroxide is deposited and coated on the surface of the Ni powders (3). The Ni powders coated with titanium hydroxide are then washed with alcohol (5). Washing with alcohol removes impurities and transforms the hydroxide ions of Ti(OH)x on the surface of the coated layer to an alkoxy group in order to reduce agglomeration of the Ni powders which may occur by condensation reaction among the hydroxide ions during the drying process. Afterwards, the coated Ni powders are dried (7). When drying is completed, the Ni powders are heat treated (9) at a temperature of 400~500° C. in an oxidative atmosphere. In this heat treatment process, titanium hydroxide is transformed into titanium oxide $TiO_2$. Thus, the manufacture of Ni powders coated with $TiO_2$ is completed.

However, the conventional sol-gel coating method has a few drawbacks as summarized below because the method uses water as the coating medium. That is, (1) Some of the coated Ni powders tend to become agglomerated. This is because of the formation of Ti—O—Ti bonding after condensation reaction between hydroxide ions of titanium hydroxide coated on the surface of a Ni powder and other hydroxide ions of titanium hydroxide coated on the surface of other Ni powders.

(2) A portion of titanium oxide may exist not on the surface of the Ni powders but as clusters between the spaces of the Ni powders and remain there, not coating the surface of the Ni powders. Further, a portion of the surface of Ni powders may remain uncoated and exposed. This is due to the usage of a large amount of water as the coating medium in which a large number of hydroxide ions are produced according to the acid-base reaction in a short period of time, and the hydroxide ions react with $TiCl_4$ at a short period of time and produce large amount of titanium hydroxide precipitations. In this case, some of the titanium hydroxide precipitates are stabilized in the water medium and remain as a cluster before contacting the Ni powders to coat the surface of the Ni powders. Accordingly, some portions of the Ni powders remain uncoated with titanium oxide.

Figure 3:
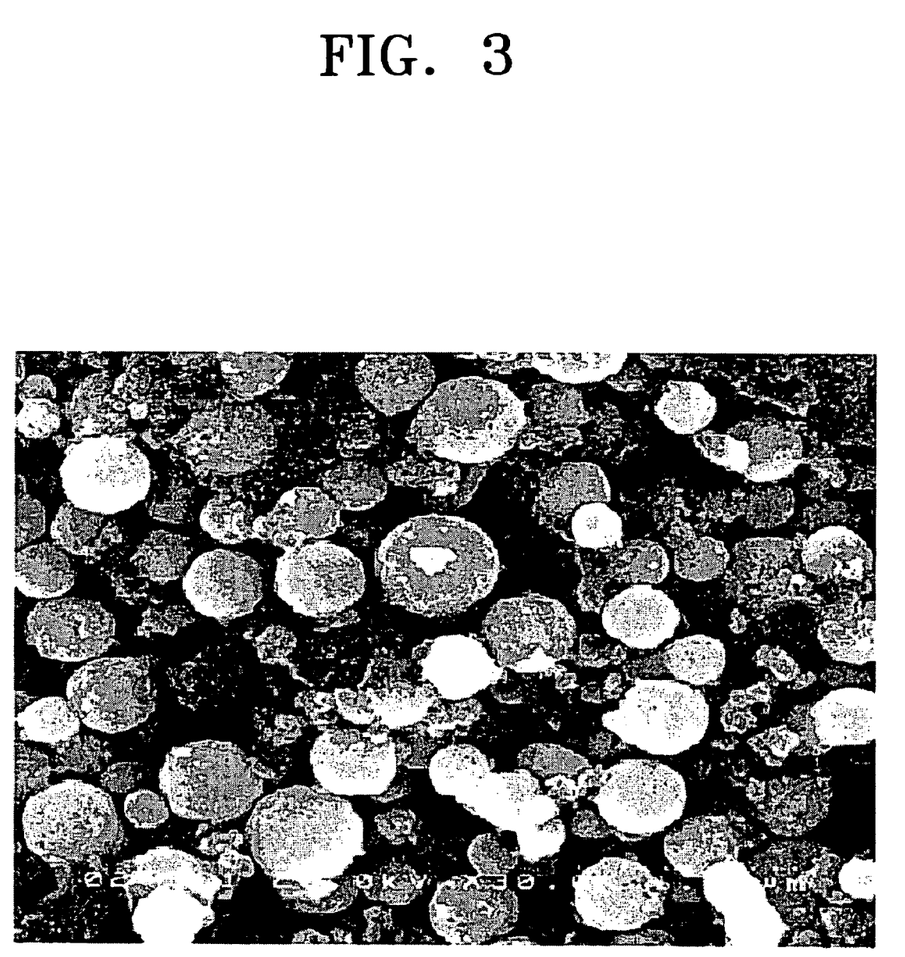
FIG. 3 is a SEM photograph of Ni powders that have been obtained by the conventional sol-gel coating method as illustrated by the flow chart in FIG. 2.

FIG. 3 is a SEM photograph of Ni powders that have been obtained by the conventional sol-gel coating method as illustrated by the flow chart in FIG. 2. Referring to FIG. 3, agglomerates of titanium hydroxide are seen between the coated spherical Ni powders, and a portion of the Ni powders is exposed without being coated with titanium hydroxide. These titanium hydroxide agglomerates are maintained during the heat treatment for crystallizing the coated layer and the agglomeration strength increases as the crystallization proceeds.

In the manufacturing of MLCC, forming a Ni electrode layer employing the Ni powders produced by the conventional sol-gel coating method causes following problems;

(1) When sintering, disconnection of Ni electrode increases. This is because Ni electrode layer, prepared by using the agglomerated Ni powders has a surface with increased roughness, increasing non-uniformity in the thickness of the Ni electrode layer.

(2) Delamination increases between the dielectric layer and the Ni electrode layer due to the large difference in the shrinkage temperature between the coated Ni powders and $BaTiO_3$. The difference arises from the fact that the Ni powders are not coated uniformly and a portion of the surface remains uncoated and exposed.

For the above stated reason, the electrode layer produced using the Ni powders produced by the conventional sol-gel coating method degrades quality of MLCC and increases failure rate. Therefore, there is a need to develop a method of coating the surface of Ni powders with metal oxide without substantially forming agglomerates and with uniform thickness to improve the quality of MLCC. A development of a method of coating inorganic powders without substantially forming agglomerates is also important in producing high capacity lithium batteries.

SUMMARY OF THE INVENTION

The present invention provides an improved method of coating the surface of inorganic powders without substantially having agglomeration of the coated inorganic powders and without substantially having a clustering of metal oxide coating materials.

The present invention provides also improved inorganic powders having a metal oxide coating with uniform thickness without substantially having an agglomeration of the coated inorganic powders and without substantially having a clustering of metal oxide coating materials.

According to an aspect of the present invention, there is provided a method of coating the surface of an inorganic powder comprising;

providing an alcohol solution of an alcohol-soluble metal salt and an alcohol solution of an amine compound; and mixing and stirring the two alcohol solutions with an inorganic powder and water, thereby coating the surface of the inorganic powder with a metal hydroxide produced from the alcohol-soluble metal salt.

The method according to an aspect of the present invention further comprises drying the inorganic powder and thermally-treating the inorganic powder at a temperature range of 300~500° C. under an oxidative atmosphere so as to convert the metal hydroxide coating into metal oxides coating.

According to an another aspect of the present invention, there is provided a inorganic powder coated with a metal oxide, wherein each of the inorganic powder exist independently without substantially being agglomerated, and wherein the metal oxide coating is deposited only on the surface of the inorganic powder with uniform thickness without being substantially clustered in the space between the inorganic powders.

Meanwhile, the inorganic powder of the present invention is interpreted in a broad sense and includes metal oxides, and other ceramic powders as well as metal powders.

The inorganic powders coated with metal oxide manufactured according to the present invention exist independently without substantial agglomeration, and the metal oxide coating is deposited substantially only on the surface of the inorganic powders with uniform thickness without substantial clustering among the inorganic powders. Consequently, when a Ni electrode layer is prepared using the titanium oxide coated Ni powders manufactured according to the present invention, not only quality but also yield of MLCC can be improved.

DETAILED DESCRIPTION OF THE INVENTION

Hereinafter, the method of coating the surface of an inorganic powder and the coated inorganic powder manufactured according to the present invention will be given in detail, while referring to FIG. 4.

Figure 4:
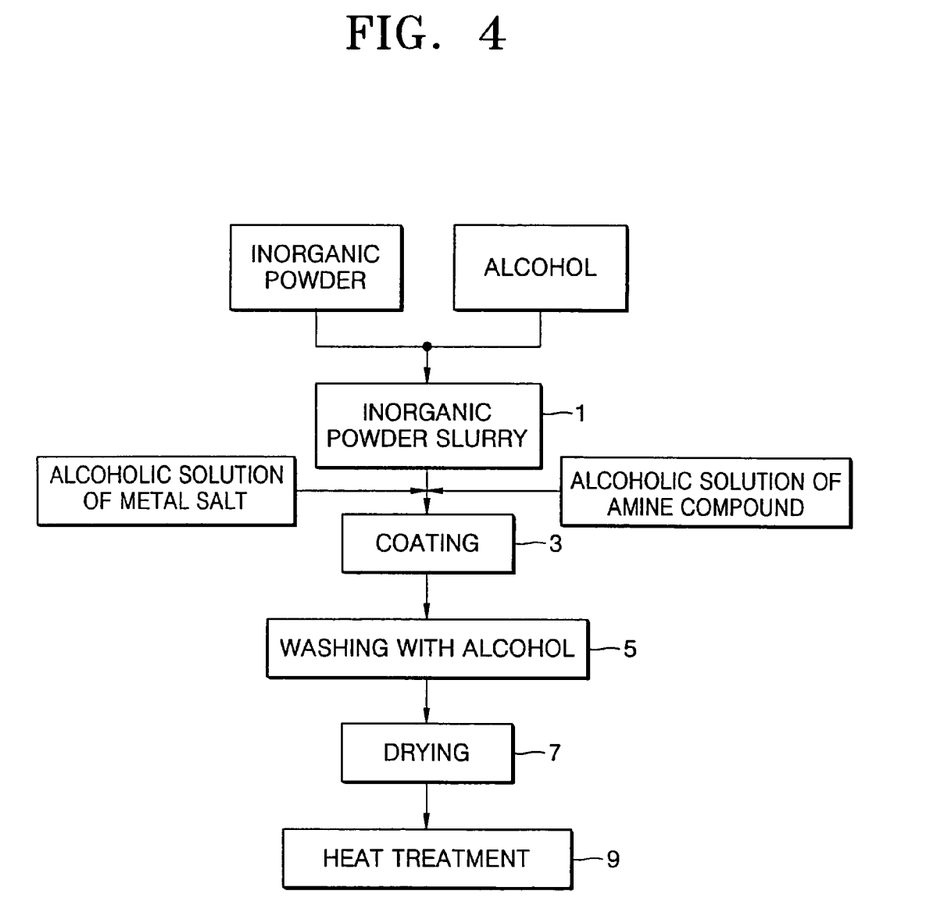
FIG. 4 is a flow chart explaining the manufacture of an inorganic powder coated with metal oxide according to an aspect of the present invention.

FIG. 4 is a flow chart explaining the manufacture of an inorganic powder coated with metal oxide according to an aspect of the present invention.

(1) Preparation of Inorganic Powder Slurry (1)

For preparation of inorganic powder slurry in a conventional sol-gel coating method, water is used as a dispersion medium, but for the present invention, alcohol is used as the dispersion medium. According to an embodiment of the present invention, the inorganic powder to be coated may be used in a slurry form, dispersed in alcohol, or used as powder itself. The inorganic powder of the present invention, may be at least one metal powder selected from the group consisting of Ni, Cu, Pd and Ag; or at least one metal oxide powder selected from the group consisting of TiO$_2$, ZrO$_2$, TiZrO$_4$, Al$_2$O$_3$, SiO$_2$, Y$_2$O$_3$, MgO, Mn$_3$O$_4$, MnO$_2$, NiO and ZnO, but not limited thereto.

(2) Method of Manufacturing of Coated Inorganic Powder (3)

An alcohol slurry of an inorganic powder is mixed under stirring with an alcohol solution of an alcohol-soluble metal salt, a small amount of water and an alcohol solution of an amine compound. Any water existing in this system is water that comes from the alcohol solution of an alcohol-soluble metal salt or that is added to the system. The alcohol-soluble metal salt react with the hydroxide ions produced according to the following reaction formula, and precipitates as metal hydroxide.

Amine compound+H$_2$O⇌Amine compound —H$^+$+ OH$^-$

The metal hydroxide is deposited and coated on the surface of the inorganic powder (3). When alcohol is used as a dispersion medium/solvent for inorganic powder, metal salt and amine compound instead of water, the formation of hydroxide ions on the surface of the inorganic powder to be coated is suppressed more than the case with using water. This reduced number of hydroxide ions enables the suppression of agglomeration of the inorganic powder coated in the following drying process. There is no specific limitation in the selection of the alcohol compounds for this purpose, but alcohol compound that has 1 to 5 OH groups and is in liquid phase at room temperature is preferable. For example, C1~C7 aliphatic mono-ol compounds, C6~C9 aromatic mono-ol compounds, C4~C7 alicyclic mono-ol compounds, C3~C7 heterocyclic mono-ol compounds, C2~C7 aliphatic di-ol compounds or C2~C7 aliphatic tri-ol compounds can be used for this purpose.

In the present invention, as the pH value in the alcohol solution increases, a slow precipitation of metal hydroxide is formed from the alcohol-soluble metal salt. Precipitation occurs fundamentally by homogeneous nucleation and heterogeneous nucleation. When the pH value in the solution increases fast, homogeneous nucleation tends to take place. In this case, nucleation of coating material tends to take place in the solution instead of on the surface of the targeted inorganic powder. Consequently, coating material develops into large particle in the solution, leaving the inorganic powder uncoated.

On the other hand, when the pH value increases slowly, heterogeneous nucleation tends to take place. In this case, nucleation of the coating material tends to occur on the surface of the inorganic powder to be coated. Therefore, the surface of the inorganic powder is coated. In the mean time, amine compound produces hydroxide group (OH—) slowly due to the acid-base reaction with water in the alcohol dispersion medium/solvent, as shown above reaction formula. Accordingly, with a slow rise of the pH value in the solution, the nucleation of coating material through heterogeneous nucleation occurs mainly on the surface of the inorganic powder, and hence the inorganic powder is coated.

Amine compounds that can be used for the present invention do not need to distinguish between primary amines (RNH$_2$), secondary amines (R$_2$NH) or tertiary amines (R$_3$N); mono amine compounds or diamine compounds; or aliphatic amine compounds or aromatic amine compounds. Particular examples include: methyl amine, di-methyl amine, tri-methyl amine, ethyl amine, di-ethyl amine, tri-ethyl amine, n-propyl amine, iso-propyl amine, n-butyl amine, sec-butyl amine, iso-butylamine, tert-butylamine, cyclohexylamine, benzylamine, α-phenylethylamine, β-phenylethylamine, ethylenediamine, tetramethylenediamine, hexamethylenediamine, aniline, methylaniline, dimethylaniline, diphenylamine, triphenylamine, o-toluidine, m-toluidine, p-toluidine, o-anisidine, m-anisidine, p-anisidine, o-chloroaniline, m-chloroaniline, p-chloroaniline, o-bromoaniline, m-bromoaniline, p-bromoaniline, o-nitroaniline, m-nitroaniline, p-nitroaniline, 2,4,5-trinitroaniline, 2,4,6-trinitroaniline, o-phenylenediamine, m-phenylenediamine, p-phenylenediamine, benzidine, p-aminobenzoic acid or sulfanilic acid.

Alcohol-soluble metal salts that can be used for the present invention are chlorides, sulphates, nitrates, acetates, and alkoxides of Ti, Zr, Si, V, Cr, Mn, Fe, Co, Zn or Pb and mixtures thereof. These alcohol-soluble metal salts are converted to metal hydroxides in the solution and form a coating layer on the surface of the particle of inorganic powder through heterogeneous nucleation. Hydroxides of, for example, Ti, Zr, Hf, Si, V, Cr, Mn, Fe, Co, Zn, Pb or mixtures thereof are coated on the surface of the inorganic powdesr.

For the method of coating inorganic powder according to an embodiment of the present invention, it is desirable to use 0.1~1.5M of the inorganic powders, 0.1~1.5M of the alcohol-soluble metal salt, 0.2~3.0M of the amine compound and 0.05~0.3M of water based on alcohol content.

If the content of the inorganic powder is less than 0.1M, manufacturing cost increases, but if it exceeds 1.5M, agglomeration problem may occur among the particles.

If the content of the alcohol-soluble metal oxide is less than 0.1M, the manufacturing cost increases, but if it exceeds 1.5M, agglomeration problem may occur among particles.

If the content of the amine compound is less than 0.2M, it does not produce sufficient hydroxide ions to supply for the reaction, but if it exceeds 3.0M, washing of excessive amine is difficult.

If the water content is less than 0.05M, the formation of hydroxides is so slow that the reaction takes a long time or the production of OH$^-$ groups for hydration is insufficient. If it exceeds 0.3M, coating may proceed not by the heterogeneous nucleation but by homogenous nucleation.

It is desirable to have a stirring time of 12 to 72 hours after mixing the above components. Preferably, the stirring time is between 24 to 48 hours. If the stirring time is less than 12 hours, the reaction does not take place sufficiently, while, if it exceeds 72 hours, the processing cost increases.

(3) Washing with Alcohol Process (5)

In the next step, the inorganic powder coated with metal hydroxide is washed with alcohol so as to remove impurities and to convert the hydroxy group on the surface of the metal hydroxide to alkoxy group, which does not undergo condensation reaction. It is desirable to use alcohols for this washing purpose that have a lower aliphatic alcohol compound with 1~5 carbon atoms such as methanol, ethanol, and iso-propanol etc.

(4) Drying Process (7)

The next step is the drying process. The above inorganic powder coated with metal hydroxide is dried at about 80~150° C. for about 1~5 hours in an oven. If the drying temperature is lower than 80° C., the solvent used for the reaction does not evaporate completely or evaporation takes a long time. If the drying temperature exceeds 150° C., unnecessary energy is wasted.

(5) Heat Treatment Process (9)

Finally, after the completion of the drying process, the above inorganic powder coated with metal hydroxide is treated at a temperature range of 300~500° C. under an oxidative atmosphere, preferably at 300~450° C., more preferably at 300~400° C., for about 1~4 hours. The temperature range for heat treatment may vary depending on the materials to be coated. In this heat treatment process, metal hydroxide coated on the surface of the inorganic powder is transformed into metal oxide. Then the manufacturing of inorganic powder being coated with metal oxide is completed. If the temperature for heat treatment is lower than 300° C., crystallization of metal oxide coating does not take place, which results in moisture release or large shrinkage in the sintering process of MLCC manufacturing process. If it is higher than 500° C., energy consumption is increased without gain in efficiency.

Hereinafter, the inorganic powder coated with metal oxide manufactured according to the above-described method will be described in detail.

The inorganic powder manufactured according to the present invention is an inorganic powder coated with a metal oxide, wherein each of the inorganic powder exist independently without substantially being agglomerated, and wherein the metal oxide coating is deposited only on the surface of the inorganic powder with uniform thickness without being substantially clustered in the space between the inorganic powders.

Metal powders or metal oxide powders may be used as the inorganic powder of the present invention but are not limited thereto. In case of metal powders, examples include Ni, Cu, Pd or Ag powder but are not limited thereto. In case of metal oxide powders, there are also no specific limits but examples include $TiO_2$, $ZrO_2$, $TiZrO_4$, $Al_2O_3$, $SiO_2$, $Y_2O_3$, MgO, $Mn_3O_4$, $MnO_2$, NiO, ZnO or mixtures thereof. For the present invention, the above metal oxides for coating include, for example, oxides of Ti, Zr, Hf, Si, V, Cr, Mn, Fe, Co, Zn, Pb or mixtures thereof In the present invention, the average diameter of the inorganic powder in the core portion is preferably about 10 nm~100 µm. If the average diameter of inorganic powder is less than about 10 nm, the agglomeration of the inorganic powders is so excessive that it is not coated uniformly on the surface of the respective particles. If it exceeds about 100 µm, it could be precipitated in the solution during the coating process because the weight of the inorganic powder increases too much. Preferably, the thickness of metal oxide coating on the surface portion is about 0.1~500 nm. If the thickness of the metal oxide coating is less than about 0.1 nm, it causes uneven coating thickness, while if it exceeds about 500 nm, it becomes merely a mixture of inorganic powder and metal oxides that does not achieve the purpose of the present invention.

While this invention has been particularly shown and described with reference to preferred embodiments thereof, it will be understood by those skilled in the art that various changes in form and details may be made therein without departing from the sprit and scope of the invention as defined by the appended claims. Following embodiments and comparisons are all relating to the $TiO_2$ coating method on the surface of Ni powders.

EXAMPLE 1

In order to make alcohol solution of Ti, 5.41M $TiCl_4$ aqueous solution was mixed with butanol to make 108 ml of 0.1M $TiCl_4$ alcohol solution. In order to make amine solution as a precipitation agent, diethylamine was mixed with butanol to prepare 576.2 ml of 0.2M diethylamine butanol solution.

6.857 g of Ni powders with an average diameter of 350 nm were added to the 0.2M diethylamine butanol solution. After stirring and dispersing the powder in the solution, the above 0.1M $TiCl_4$ butanol solution was added and stirring continued for about 24 hours while the coating reaction was proceeding.

After the coating reaction was completed, the Ni powders were washed with ethanol and dried for about 24 hours in an oven at about 60° C. In order to observe the coating states and the agglomeration states of the coated Ni powders after drying, SEM analysis was performed. The investigation revealed that coated Ni powders exist independently without agglomeration and that titanium hydroxides were deposited substantially only on the surface of the Ni powders and did not exist independently outside of the surface of the Ni powder.

Figure 5:
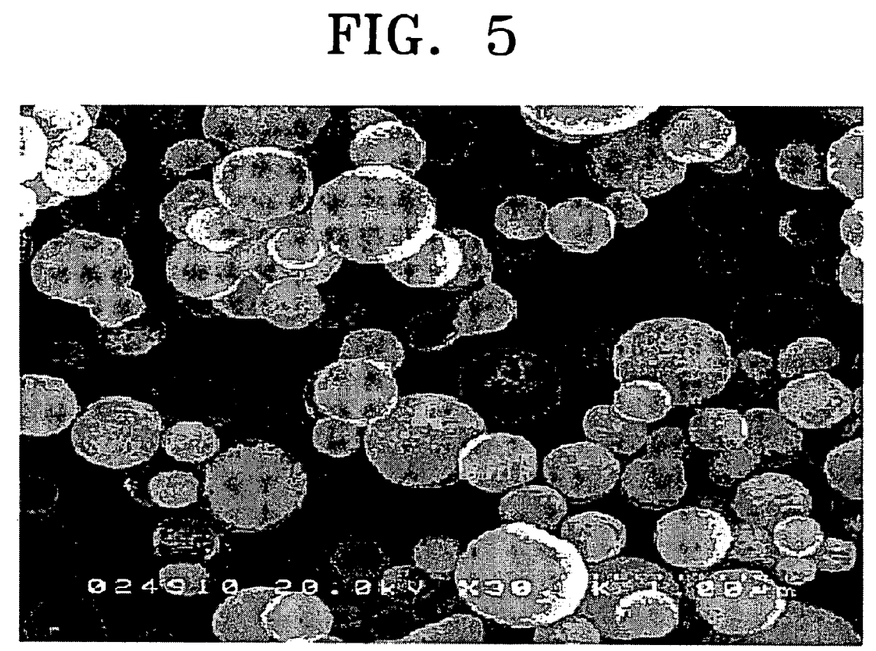
FIG. 5 is a SEM photograph of Ni powders coated with about 19 wt % of titanium hydroxide based on the weight of the Ni powders, manufactured in Example 1 according to the present investment.

FIG. 5 is a SEM photograph of Ni powders coated with about 19 wt % of titanium hydroxide based on the weight of the Ni powders, manufactured in Example 1 according to the present investment.

Referring to FIG. 5, the coated Ni powders exist independently without agglomeration, and also the above titanium hydroxide coating occurs substantially only on the surface of the Ni powder with a uniform thickness and that no clustering occurred between the Ni powders.

The above dried Ni powders were treated at about 300° C. in the air to convert the titanium hydroxide on the surface of the Ni powders to crystalline $TiO_2$.

Figure 6:
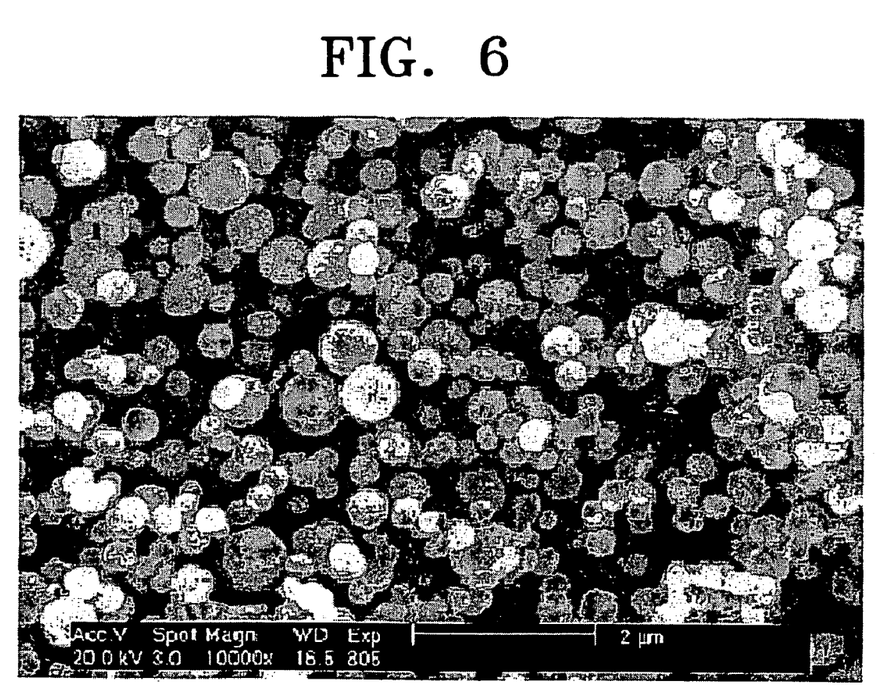
FIG. 6 is a SEM photograph of Ni powders coated with TiO$_2$, which are obtained by heat-treating the Ni powders coated with about 19 wt % of titanium hydroxide based on the weight of the Ni powders at 300° C. in air.

FIG. 6 is a SEM photograph of Ni powders coated with $TiO_2$, which are obtained by heat-treating the Ni powders coated with about 19 wt % of titanium hydroxide based on the weight of the Ni powders at 300° C. in the air. Referring to FIG. 6, it is clearly seen that the coated Ni powders exist independently without agglomeration, and also that the above titanium oxide coating occurs substantially only on the surface of the Ni powders with a uniform thickness and that no clustering occurs between the Ni powders.

EXAMPLE 2

6.857 g of Ni powders with an average diameter of 350 nm was added to 576.2 ml of butanol solution of 0.2M diethylamine. The Ni powders were stirred and dispersed in the solution. Then, 108 ml of butanol solution of 0.1M $TiCl_4$ is added to this solution. Afterwards, 1.4 g water was added to the resulting solution so as to produce hydroxide groups according to following reaction formula:

$(C_2H_5)_2NH + H_2O \leftrightarrows (C_2H_5)_2NH_2^+ + OH^-$

The same procedures as described in Example 1 were followed. A SEM photograph observation showed that the coated Ni powders exist independently without substantial agglomeration among the particles. Moreover, the observation revealed that crystalline $TiO_2$ produced as a result of heat treatment at about 300° C. deposited substantially only on the surface of the Ni powders, and that practically no $TiO_2$ was found to exist independently between the Ni powders.

EXAMPLE 3

Ni powders coated with $TiO_2$ were manufactured using the same method as in Example 1, except that the concentration of the diethylamine butanol solution was changed from 0.2M to 0.4M and that of $TiCl_4$ butanol solution was changed from 0.1M to 0.2M.

A SEM photograph observation showed that the coated Ni powders exist independently without substantial agglomeration among the particles. Moreover, the observation revealed that crystalline $TiO_2$ produced as a result of heat treatment at about 300° C. deposited substantially only on the surface of the Ni powders, and that practically no $TiO_2$ was found to exist independently between the Ni powders.

EXAMPLE 4

Ni powders coated with $TiO_2$ were manufactured using the same method as in Example 1, except that the concentration of the diethylamine butanol solution was changed from 0.2M to 0.8M and that of $TiCl_4$ butanol solution was changed from 0.1M to 0.4M.

A SEM photograph observation showed that the coated Ni powders exist independently without substantial agglomeration among the particles. Moreover, the observation revealed that crystalline $TiO_2$ produced as a result of heat treatment at about 300° C. deposited substantially only on the surface of the Ni powders, and that practically no $TiO_2$ was found to exist independently between the Ni powders.

EXAMPLE 5

Ni powders coated with $TiO_2$ were manufactured using the same method as in Example 1, except that cyclohexylamine was used as a precipitating agent instead of diethylamine.

A SEM photograph observation showed that the coated Ni powders exist independently without substantial agglomeration among the particles. Moreover, the observation revealed that crystalline $TiO_2$ produced as a result of heat treatment at about 300° C. deposited substantially only on the surface of the Ni powders, and that practically no $TiO_2$ was found to exist independently between the Ni powders.

EXAMPLE 6

Ni powders coated with $TiO_2$ were manufactured using the same method as in Example 1, except that propylamine was used as a precipitating agent instead of diethylamine.

A SEM photograph observation showed that the coated Ni powders exist independently without substantial agglomeration among the particles. Moreover, the observation revealed that crystalline $TiO_2$ produced as a result of heat treatment at about 300° C. deposited substantially only on the surface of the Ni powders, and that practically no $TiO_2$ was found to exist independently between the Ni powders.

EXAMPLE 7

Ni powders coated with $TiO_2$ were manufactured using the same method as in Example 1, except that butylamine was used as a precipitating agent instead of diethylamine.

A SEM photograph observation showed that the coated Ni powders exist independently without substantial agglomeration among the particles. Moreover, the observation revealed that crystalline $TiO_2$ produced as a result of heat treatment at about 300° C. deposited substantially only on the surface of the Ni powders, and that practically no $TiO_2$ was found to exist independently between the Ni powders.

EXAMPLE 8

Ni powders coated with $TiO_2$ were manufactured using the same method as in Example 1, except that propanol was used as a dispersion medium/solvent instead of butanol.

A SEM photograph observation showed that the coated Ni powders exist independently without substantial agglomeration among the particles. Moreover, the observation revealed that crystalline $TiO_2$ produced as a result of heat treatment at about 300° C. deposited substantially only on the surface of the Ni powders, and that practically no $TiO_2$ was found to exist independently between the Ni powders.

EXAMPLE 9

Ni powders coated with $TiO_2$ were manufactured using the same method as in Example 1, except that ethanol was used as a dispersion medium/solvent instead of butanol.

A SEM photograph observation showed that the coated Ni powders exist independently without substantial agglomeration among the particles. Moreover, the observation revealed that crystalline $TiO_2$ produced as a result of heat treatment at about 300° C. deposited substantially only on the surface of the Ni powders, and that practically no $TiO_2$ was found to exist independently between the Ni powders.

EXAMPLE 10

Ni powders coated with $TiO_2$ were manufactured using the same method as in Example 1, except that methanol was used as a dispersion medium/solvent instead of butanol.

A SEM photograph observation showed that the coated Ni powders exist independently without substantial agglomeration among the particles. Moreover, the observation revealed that crystalline $TiO_2$ produced as a result of heat treatment at about 300° C. deposited substantially only on the surface of the Ni powders, and that practically no $TiO_2$ was found to exist independently between the Ni powders.

COMPARATIVE EXAMPLE 1

In order to make an aqueous solution of Ti, 5.41M $TiCl_4$ aqueous solution was diluted to make 108 ml of 0.1M $TiCl_4$ aqueous solution. A 29 wt % aqueous solution of ammonia was prepared as a precipitating agent.

6.857 g of Ni powders with an average diameter of about 350 nm was mixed and dispersed in 576.2 ml of water. While stirring the solution, 108 ml of 0.1M $TiCl_4$ aqueous solution was added by a burette. In order to maintain the pH value of the solution at about 10 when the 0.1M $TiCl_4$ aqueous solution was added, a 29 wt % aqueous solution of ammonia was added by a burette to the aqueous solution of Ni powders.

After this addition, stirring continued for about 1 hour to produce titanium hydroxide coating on the surface of the Ni powders. The coated powders thus obtained were washed with ethanol and dried in an oven at about 60° C. for about 24 hours.

In order to observe the coating states and the agglomeration states of the coated Ni powders after drying, SEM analysis was performed. The investigation revealed that coated Ni powders did not exist independently but agglomerated, and the titanium hydroxides were deposited not only on the surface of the Ni powder but also existed as particles outside of the surface of the Ni powders.

The above dried Ni powder was treated at about 300° C. in the air so as to convert the titanium hydroxide coated on the surface of the Ni powders to crystalline $TiO_2$. FIG. 3 is a SEM photograph of the Ni powders coated with 19 wt % of titanium hydroxide based on the weight of the Ni powders in accordance with the present comparative example. Referring to FIG. 3, agglomerates of titanium hydroxide are seen between the coated spherical Ni powders, and a portion of the Ni powders is exposed without being coated with titanium hydroxide. These titanium hydroxide agglomerates are maintained during the heat treatment for crystallizing the coated layer and the agglomeration strength increases as the crystallization proceeds.

What is claimed is:

1. A method of coating the surface of an inorganic powder comprising:
   (a) providing an alcohol solution of an alcohol-soluble metal salt and an alcohol solution of an amine compound; and
   (b) mixing and stirring the two alcohol solutions with an inorganic powder and water, thereby coating the surface of the inorganic powder with a metal hydroxide produced from the alcohol-soluble metal salt,
   wherein the amine compound is at least one selected from the group consisting of methyl amine, di-methyl amine, tri-methyl amine, ethyl amine, di-ethyl amine, tri-ethyl amine, n-propyl amine, iso-propyl amine, n-butyl amine, sec-butyl amine, iso-butylamine, tert-butylamine, cyclohexylamine, benzylamine, α-phenylethylamine, β-phenylethylamine, ethylenediamine, tetramethylenediamine, hexamethylenediamine, aniline methylaniline, dimethylaniline, diphenylamine, triphenylamine, o-toluidine, m-toluidine, p-toluidine, o-anisidine, m-anisidine, p-anisidine, o-chloroaniline, m-chloroaniline, p-chloroaniline, o-bromoaniline, m-bromoaniline, p-bromoaniline, o-nitroaniline, m-nitroaniline, p-nitroaniline, 2,4,5-trinitroaniline, 2,4,6-trinitroaniline, o-phenylenediamine, m-phenylenediamine, p-phenylenediamine, and benzidine.

2. The method of claim 1, further comprising drying the inorganic powder and heat-treating the inorganic powder at a temperature range of 300~500° C. under an oxidative atmosphere so as to convert the metal hydroxide coating into a metal oxide coating.

3. The method of claim 2, further comprising the step of washing the inorganic powder coated with the metal hydroxide using a lower aliphatic alcohol with 1 to 4 carbon atoms between the drying step and the heat-treating step.

4. The method of claim 1, wherein 0.1~1.5M of the inorganic powder, 0.1~1.5M of the alcohol-soluble metal salt, 0.2~3.0M of the amine compound and 0.05~0.3M of water is stirred for 12~72 hours.

5. The method of claim 1, wherein the inorganic powder is mixed in a slurry state dispersed in alcohol or in powder state itself.

6. The method of claim 1, wherein the alcohol is an alcohol compounds having 1~5 OH groups and is in liquid phase at room temperature.

7. The method of claim 6, wherein the alcohol is C1~C7 aliphatic mono-ol compound, C6~C9 aromatic mono-ol compound, C4~C7 alicyclic mono-ol compound, C3~C7 heterocyclic mono-ol compound, C2~C7 aliphatic di-ol compound or C2~C7 aliphatic tri-ol compound.

8. The method of claim 1, wherein the inorganic powder is at least one metal powder selected from the group consisting of Ni, Cu, Pd and Ag.

9. The method of claim 1, wherein the inorganic powder is at least one metal oxide powder selected from the group consisting of $TiO_2$, $ZrO_2$, $TiZrO_4$, $Al_2O_3$, $SiO_2$, $Y_2O_3$, MgO, $Mn_3O_4$, $MnO_2$, NiO and ZnO.

10. The method of claim 1, wherein the alcohol-soluble metal salt includes chlorides, sulfates, nitrates, acetates or alkoxides of Ti, Zr, Hf, Si, V, Cr, Mn, Fe, Go, Zn, Pb or mixtures thereof.

11. The method of claim 2, wherein the metal hydroxide includes metal hydroxide of Ti, Zr, Hf, Si, V, Cr, Mn, Fe, Co, Zn, Pb or mixtures thereof.

12. An inorganic powder coated with metal oxide on the surface of the powder prepared by the method according to claim 1.

13. An inorganic powder coated with metal oxide on the surface of the powder prepared by the method according to claim 2.

14. An inorganic powder coated with metal oxide on the surface of the powder prepared by the method according to claim 3.

15. An inorganic powder coated with metal oxide on the surface of the powder prepared by the method according to claim 4.

16. An inorganic powder coated with metal oxide on the surface of the powder prepared by the method according to claim 5.

17. An inorganic powder coated with metal oxide on the surface of the powder prepared by the method according to claim 6.

18. An inorganic powder coated with metal oxide on the surface of the powder prepared by the method according to claim 7.

19. An inorganic powder coated with metal oxide on the surface of the powder prepared by the method according to claim 8.

20. An inorganic powder coated with metal oxide on the surface of the powder prepared by the method according to claim 9.

21. An inorganic powder coated with metal oxide on the surface of the powder prepared by the method according to claim 10.

22. An inorganic powder coated with metal oxide on the surface of the powder prepared by the method according to claim 11.

* * * * *